March 25, 1924.

O. H. JEWELL

PACKING BOX

Filed July 7, 1919  2 Sheets-Sheet 2

Witness:
Harry S. Gaither

Inventor
Omar H. Jewell
by Dynforth, Lee, Chritton & Wiles
Atty's:

Patented Mar. 25, 1924.

1,488,153

UNITED STATES PATENT OFFICE.

OMAR H. JEWELL, OF CHICAGO, ILLINOIS, ASSIGNOR TO CHLORINE PRODUCTS COMPANY, OF CHICAGO, ILLINOIS, A CORPORATION OF ILLINOIS.

PACKING BOX.

Application filed July 7, 1919. Serial No. 309,096.

*To all whom it may concern:*

Be it known that I, OMAR H. JEWELL, a citizen of the United States, residing at Chicago, in the county of Cook and State of Illinois, have invented a new and useful Improvement in Packing Boxes, of which the following is a specification.

My invention relates generally to improvements in packing-boxes for shafts, and more particularly to the packing-boxes of compressors employing a lubricant of such character that the packing surrounding the shafts and subjected to the lubricant is rendered very hard and resistant to removal, as for example where sulphuric acid is employed as the lubricant in chlorine gas compressors, my invention having been devised for use more particularly in this connection.

My object is to provide for the ready installation and removal, when necessary, of the packing for shafts, especially the shafts of sulphuric-acid-lubricated compressors.

Figure 1:
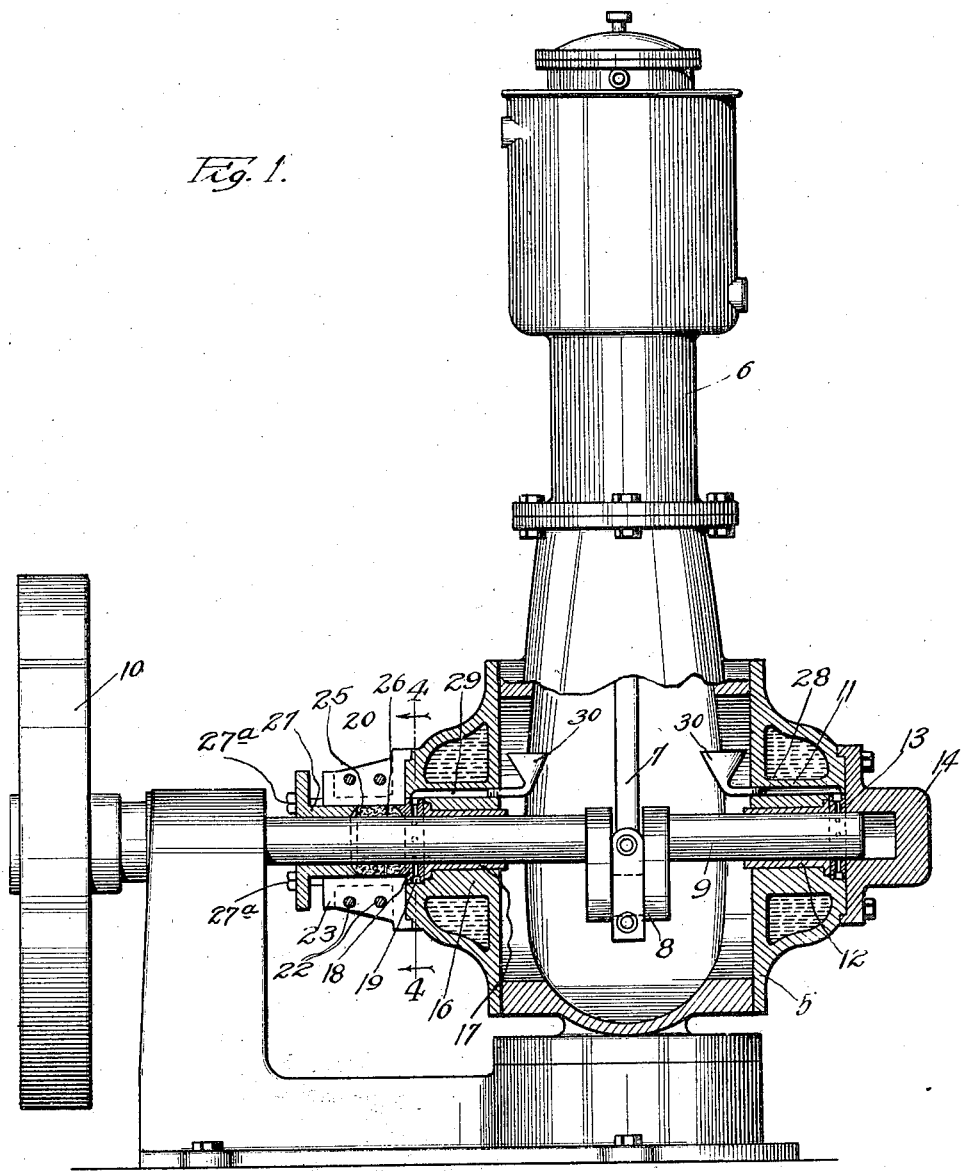
Figure 2:
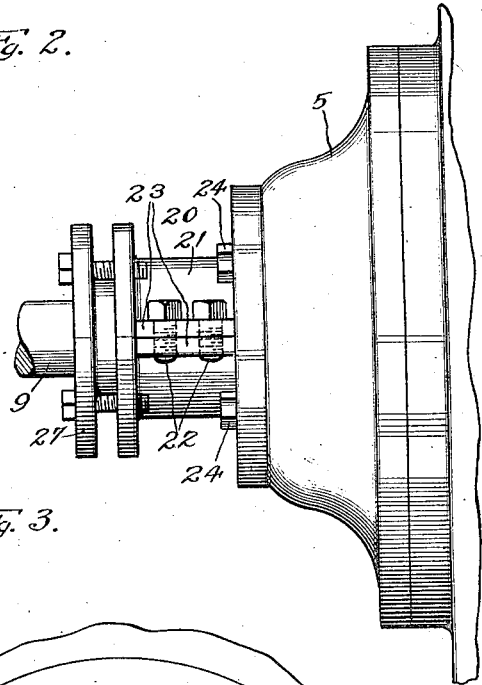
Figure 3:
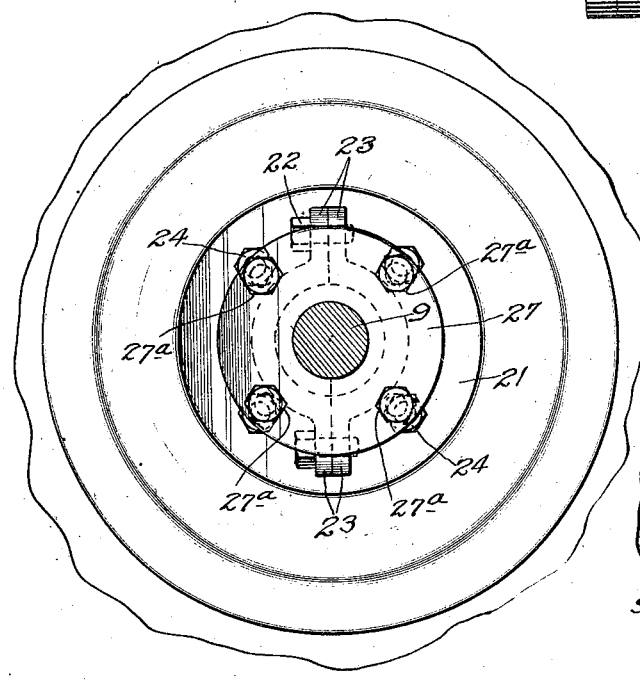
Figure 4:
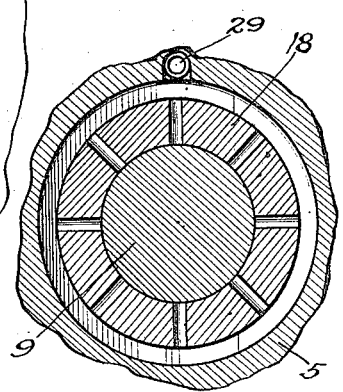

Referring to the accompanying drawings:—Fig. 1 is a view in elevation, partly sectional, of a compressor, as for example for compressing chlorine gas, embodying my improvement. Fig. 2 is an enlarged view in elevation of one end of the crank-case of the compressor and the shaft bearing provided at this point. Fig. 3 is an end view of the structure shown in Fig. 2, the shaft being shown in section; and Fig. 4, an enlarged section taken at the line 4—4 on Fig. 1 and viewed in the direction of the arrows.

In the particular construction shown, 5 represents the closed crank-case of a compressor of the reciprocating type surmounted by the cylinder 6 containing the compressing-piston (not shown) the pitman of which, represented at 7, connects with the crank-portion 8 of a crank-shaft 9 extending through the crank-case 5 and journaled at its ends in the opposite side-walls of the case 5. The shaft 9 at the end thereof opposite that which carries the fly-wheel 10, to which the power for driving the shaft may be applied, is journaled in the bearing-portion 11 of the case 5, a flanged bushing 12 being interposed between the shaft and bearing 11, this bushing being insertible to place from the outer side of the case 5. Beyond the bushing a lantern-ring 13 surrounds the shaft, and beyond these parts the case 5 is provided with a cap-bearing 14 bolted to the crank-case 5, the flanged portion of the bushing 12 and the ring 13, extending into a recess 15 in the wall of the crank-case. The opposite end of the shaft 9 is journaled in the bearing 16 of the crank-case, with a flanged bushing 17 interposed between the bearing 16 and the shaft, and a lantern seat ring 18 surrounding the latter, this ring and the flange of the bushing being located in a recess 19 in the wall of the crank-case 5. The case 5 beyond the bearing 16 is provided with a packing-box 20 for receiving, and in which is confined, the packing for the shaft 9. The packing-box 20 is formed of longitudinally-extending sections 21 each preferably of semi-circular shape to afford one-half of the box as shown, these sections being releasably secured together in a position in which they encircle the shaft 9, as by screws 22 engaging abutting flanges 23 on these sections, and secured to the adjacent wall of the crank-case, preferably each separately, by the screws 24. The packing-box 20 thus provided is spaced from the shaft to present a packing-receiving annular space 25 in which the packing represented at 26 is confined, the packing being held in proper position therein by means of a packing-gland 27 encircling the shaft 9 and held in place on the journal 20 in any desirable way, as by the screws 27$^a$ which extend thru openings in the flange of the gland 27 and screw into the flanges of the sections 21, four of such screws being used, two of them engaging one of the sections 21 and the other two the other section 21.

The rings 13 and 18 are provided for the usual purpose of supplying lubricant to the bearings, these rings, in the arrangement shown, being connected with passages 28 and 29, respectively, having funnels 30 at their inner ends, through which the lubricant is supplied to the apertures of the rings, the lubricant entering the funnels by reason of the splashing of the lubricant in the crank-case under the action of the operating parts therein.

It will be understood that the packing is rendered readily removable without danger of impairing the shaft and in very much less time than is required with prior structures even when the packing has become very hard, by the removal of one or both of the packing-box sections 21, and that new packing may be readily applied to position for performing the packing function.

While I have illustrated and described a particular construction embodying my invention I do not wish to be understood as intending to limit it thereto, as the same may be variously modified and altered without departing from the spirit of my invention.

What I claim as new and desire to secure by Letters Patent, is:

In a machine having a casing presenting a chamber and a movable shaft extending therefrom, said casing being provided with a ring surrounding said shaft, packing means operating to cut off communication with said chamber around said shaft formed of packing surrounding said shaft and abutting the outer surface of said ring and a packing box formed of sections arranged about the shaft with the joints between said sections extending lengthwise of said shaft, said packing being located in the space provided by said packing box, and the sections of said packing box being connected at one end of the latter to the wall of said chamber, and means for forcing said packing against said ring.

OMAR H. JEWELL.